US010348445B2

(12) United States Patent
Rask et al.

(10) Patent No.: US 10,348,445 B2
(45) Date of Patent: Jul. 9, 2019

(54) METHODS AND DEVICES FOR CELL EDGE ROBUSTNESS OF PDCCH

(71) Applicant: TELEFONAKTIEBOLAGET LM ERICSSON (PUBL), Stockholm (SE)

(72) Inventors: Patrik Rask, Sollentuna (SE); Carola Faronius, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 157 days.

(21) Appl. No.: 15/504,433

(22) PCT Filed: Dec. 20, 2016

(86) PCT No.: PCT/SE2016/051298
§ 371 (c)(1),
(2) Date: Feb. 16, 2017

(87) PCT Pub. No.: WO2017/116298
PCT Pub. Date: Jul. 6, 2017

(65) Prior Publication Data
US 2018/0054277 A1 Feb. 22, 2018

Related U.S. Application Data

(60) Provisional application No. 62/272,906, filed on Dec. 30, 2015.

(51) Int. Cl.
*H04L 1/00* (2006.01)
*H04L 5/00* (2006.01)
(Continued)

(52) U.S. Cl.
CPC .......... *H04L 1/0006* (2013.01); *H04L 5/006* (2013.01); *H04L 5/0053* (2013.01);
(Continued)

(58) Field of Classification Search
CPC ....... H04L 5/0053; H04L 1/20; H04L 1/0006; H04L 5/006; H04L 5/0039; H04L 5/0085; H04W 72/082; H04W 72/042
See application file for complete search history.

(56) References Cited

U.S. PATENT DOCUMENTS

2010/0302983 A1\* 12/2010 McBeath .............. H04L 5/0005
370/311
2011/0267967 A1\* 11/2011 Ratasuk ................ H04L 5/0053
370/252
(Continued)

FOREIGN PATENT DOCUMENTS

WO 2014113171 A1 7/2014

*Primary Examiner* — Will W Lin

(57) ABSTRACT

A method performed in a base station includes the base station determining a level of interference in a channel between the base station and the wireless communication device based on a signal-to-noise-ratio (SNR) in the channel. The base station determines, in accordance with the determined interference, whether to use a predetermined power level to transmit a message to the wireless communication device. In response to determining to use the predetermined power level, the base station further determines whether the wireless communication device requires downlink signal radio bearer (SRB) assignments. In response to determining that the wireless communication device requires the downlink signal radio bearer assignments, the base station transmits the message to the wireless communication device using a downlink control information (DCI) message format having a same size as a message format used for uplink messages.

12 Claims, 7 Drawing Sheets

(51) Int. Cl.
*H04W 72/04* (2009.01)
*H04W 72/08* (2009.01)

(52) U.S. Cl.
CPC .......... *H04L 5/0039* (2013.01); *H04L 5/0085* (2013.01); *H04W 72/042* (2013.01); *H04W 72/082* (2013.01)

(56) References Cited

U.S. PATENT DOCUMENTS

| | | | |
|---|---|---|---|
| 2011/0269492 A1* | 11/2011 | Wang | H04L 5/003 455/509 |
| 2012/0093118 A1* | 4/2012 | Peters | H04L 1/0081 370/329 |
| 2012/0236814 A1* | 9/2012 | Nishio | H04L 5/001 370/329 |
| 2013/0163543 A1* | 6/2013 | Freda | H04W 72/0406 370/329 |
| 2014/0050191 A1* | 2/2014 | Kim | H04L 5/001 370/329 |
| 2015/0172022 A1 | 6/2015 | Guo et al. | |
| 2016/0183231 A1* | 6/2016 | Shi | H04W 72/0446 370/329 |

\* cited by examiner

METHODS AND DEVICES FOR CELL EDGE ROBUSTNESS OF PDCCH

This application is a 371 of International Application No. PCT/SE2016/051298, filed Dec. 20, 2016, which claims priority to U.S. Provisional Application No. 62/272,906, filed Dec. 30, 2015, the disclosures of which are fully incorporated herein by reference.

TECHNICAL FIELD

This disclosure relates generally to improving cell edge robustness, and, more particularly, to methods and devices for cell edge robustness of a Physical Downlink Control Channel (PDCCH).

BACKGROUND

Long Term Evolution (LTE), a radio access technology standardized by the 3rd Generation Partnership Project (3GPP), is based on orthogonal frequency division multiplexing (OFDM) in the downlink and single-carrier frequency domain multiple access (SC-FDMA) in the uplink. This use of OFDM and SC-FDMA divides transmission resources into time resources and frequency resources. Time resources are divided into subframes that are each 1 ms in duration. Each subframe is in turn generally divided into 12 or 14 slots, each of which is occupied by one OFDM or SC-FDMA symbol. Frequency resources in each subframe are divided into subcarriers. The combination of a particular slot at a particular subcarrier is referred to as a resource element (RE). The subframe can thus divide transmission resources into a plurality of REs. The REs can be organized into resource element groups (REGs) and physical resource blocks (PRBs). Each REG includes, for example, 4 consecutive REs, while a PRB includes, for example, 72 REs (6 slots×12 subcarriers) or 84 REs (7 slots×12 subcarriers).

The subframe may also be divided into a control region and a data region. The control region may include, for example, 3 slots that carry physical downlink control channels (PDCCHs). The PDCCHs are used to carry downlink control information (DCI) messages. Each PDCCH may be allocated transmission resources in units of control channel elements (CCEs). Each CCE includes, for example, 9 consecutive REGs. An aggregation level (L) indicates how many contiguous CCEs (also referred to as consecutive CCEs) are allocated to a PDCCH. Example aggregation levels include 1, 2, 4, 8. An aggregation level of 2, for example, indicates that a PDCCH is allocated 2 consecutive CCEs.

Each PDCCH generally carries 1 DCI message. The DCI message may indicate, to a particular subframe recipient, which PRBs in the data region are intended for that recipient. For instance, a base station (e.g., evolved node B (eNB)) may include data for different wireless communication devices (WCDs) in one subframe. The base station may include, for each of those WCDs, a DCI message that indicates which PRBs in that subframe are intended for that WCD.

Different DCI formats exist for packing formatting information into a DCI message. Example formats include DCI formats 0, 1, 1A, 1B, 1C, 1D, 2, 2A, 2B, 2C, 3, 3A, and 4. DCI formats 0, 3, 3A, and 4 are used for granting uplink (UL) transmission resources to WCDs. DCI formats 1, 1A, 1B, 1C, 1D, 2, 2A, 2B, and 2C are used for assigning downlink (DL) resources to WCDs (see 3GPP 36.212, section 5.3.3). Different formats may provide for different DCI message sizes. That is, each DCI format may be associated with a certain DCI message size. A DCI message with a DCI format of 2 may, in one example, have a larger size than a DCI message with a DCI format of 1, though DCI message sizes may depend on a subframe's bandwidth. Some DCI formats may be associated with the same DCI message size. For example, a DCI message with a DCI format of 1A may have the same size as a DCI message with a DCI format of 0, 3, or 3A.

Some DCI formats may support a spatial multiplexing scheme that uses multiple input/multiple output (MIMO) techniques to transmit different layers (e.g., streams) of data on different transmitters toward different receivers. For instance, a base station may use a transmission rank of 2 to transmit two different streams of data on two respective antennas toward two receivers of a WCD. In some instances, the base station may limit transmission rank to 1, in which case, as an example, it transmits a single stream of data on one or more transmitters.

During handover (HO) of a wireless communication device (WCD) (e.g., a user equipment (UE)) there may be messages that are sent to/from the WCD while the WCD is in a problematic radio environment (e.g., when the WCD is at the cell edge). This can then lead to disruption of the connection or longer interruption times.

To obtain scheduling flexibility, and to use MIMO and the discontinuous allocation properties of OFDM, DCI format 2A is normally used for transmitting downlink (DL) messages. However, there is an imbalance for PDCCH Format 2A for DL and PDCCH Format 1A for UL of up to 1.7 dB for 20 MHz bandwidth since the used DL format is larger than the UL format.

Therefore, the base station can receive UL PDCCH grants while not receiving the DL assignments, which degrades voice quality. An example of this imbalance is where the base station can receive measurement reports but the WCD cannot hear the handover command.

SUMMARY

According to some embodiments, a method performed in a base station includes the base station determining a level of interference in a channel between the base station and a wireless communication device (e.g., mobile device that can communicate wirelessly). The determining of the level of interference may be based on a signal-to-noise-ratio (SNR) in the channel. The method further includes the base station determining, in accordance with the determined level of interference, whether to use a predetermined aggregation level (also referred to herein as "power level") to transmit a message (e.g., a handover command) to the wireless communication device. The method further includes, the base station determining whether the wireless communication device requires downlink signal radio bearer (SRB) assignments (in some embodiments, this determining step is performed in response to determining to use the predetermined power level (i.e., aggregation level)). The method also includes in response to determining that the wireless communication device requires the downlink SRB assignments, the base station transmitting the message to the wireless communication device using a downlink control information (DCI) message format (e.g., DCI Format 1A) having a same size as a message format used for uplink messages (in some embodiments, the message is transmitted using Tx diversity). In some embodiments, the predetermined aggregation level is 8. In some embodiments, the base station measures the SNR of the channel between the base station and the wireless communication device, whereas in other embodiments, the base station receives a measurement report from the wireless communication device, the measurement report including the SNR of the channel between the base station and the wireless communication device. In some embodiments, the base station determines to use the predetermined aggregation level in response to determining that the determined level of interference is below a predetermined threshold.

In some embodiments, a method performed in a base station includes the base station determining whether to use transmit diversity in message to a wireless communication device. The method further includes, in response to determining that the base station will use transmit diversity, the base station transmitting the message to the wireless communication device using transmit diversity and a downlink control information (DCI) message format (e.g., DCI format 1A) used for uplink messages.

According to some embodiments, a base station comprises a memory, and a processor coupled to the memory. The processor is configured (e.g., based on instructions contained in the memory) to determine a level of interference in a channel between the base station and the wireless communication device (this determination may be based on a signal-to-noise-ratio (SNR) in the channel). The processor is further configured to determine, in accordance with the determined interference, whether to use a predetermined power level (i.e., aggregation level) to transmit a message (e.g., handover command) to the wireless communication device. The processor is further configured to determine whether the wireless communication device requires downlink signal radio bearer (SRB) assignments (this determination may be made in response to determining to use the predetermined aggregation level). The processor is further configured to, in response to determining that the wireless communication device requires the downlink SRB assignments, transmit the message to the wireless communication device using a downlink control information (DCI) message format (e.g., DCI format 1A) having a same size as a message format used for uplink messages.

In some embodiments, a base station comprises a memory, and a processor coupled to the memory. The processor is configured (e.g., based on instructions contained in the memory) to determine whether to use transmit diversity in message to a wireless communication device. The processor is further configured to, in response to determine that the base station will use transmit diversity, transmit the message to the wireless communication device using transmit diversity and a downlink control information (DCI) message format (e.g., DCI format 1A) used for uplink messages.

According to some embodiments, a method performed in a base station includes the base station determining whether a WCD requires a downlink SRB assignment. The base station also determines a CCE aggregation level for a transmission to the WCD based on whether the WCD requires the SRB assignment. The base station also determines whether a certain set of one or more conditions is satisfied, wherein determining whether the set of conditions is satisfied comprises the base station determining whether the determined CCE aggregation level is equal to a maximum CCE aggregation level. In response to determining that the set of conditions is satisfied, the base station selects, from among a plurality of DCI formats corresponding to different respective DCI message sizes, a first DCI format, wherein the first DCI format is a robust DCI format, and the base station transmits a message to the WCD using the first DCI format.

According to some embodiments, a method performed in a base station includes the base station determining whether a WCD requires a downlink SRB assignment, and, as a result of determining that the WCD requires the SRB assignment, the base station: i) uses a maximum CCE aggregation level for the SRB assignment and ii) uses a robust DCI message format for the SRB assignment (e.g., DCI format 1A).

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

In some situations when a WCD is in a handover (HO) zone and moving towards another cell, there is not enough time to do retransmissions, either on MAC or RLC level. According to some embodiments, to increase the probability that a message (e.g., rrcReconfiguration (HO command)) transmitted to the WCD is successfully received by the WCD, including the DL allocation information on PDCCH, the base station enters a "maximum" robustness state for those messages.

For example, in some embodiments, for the PDCCH, the base station uses DCI format 1A and also applies an extra power for that message. Format 1A is a small DCI format, and as such, the coding rate will decrease and the probability to reach the WCD is increased with respect to DCI Format 2. Using DCI Format 1A for DL messages may be performed for the rrcReconfiguration message alone, or for data as well if the link indicates a communication problem. At handover, the target cell can also be identified and the target cell can be notified to reduce interfering transmissions, at least during the time when the HO command (rrcReconfiguration) is sent in the source cell.

Since format 1A limits the scheduling flexibility as well as limits transmission to Rank 1, embodiments are directed to determining when to use DCI Format 1A for downlink messages. For example, when the WCD is in the high pathloss and/or interference limited scenario, the base station uses the 8 CCE aggregation level (maximum allocation for PDCCH) to force DCI Format 1A, and thus, TX diversity to the DL SRB assignments.

Figure 1:
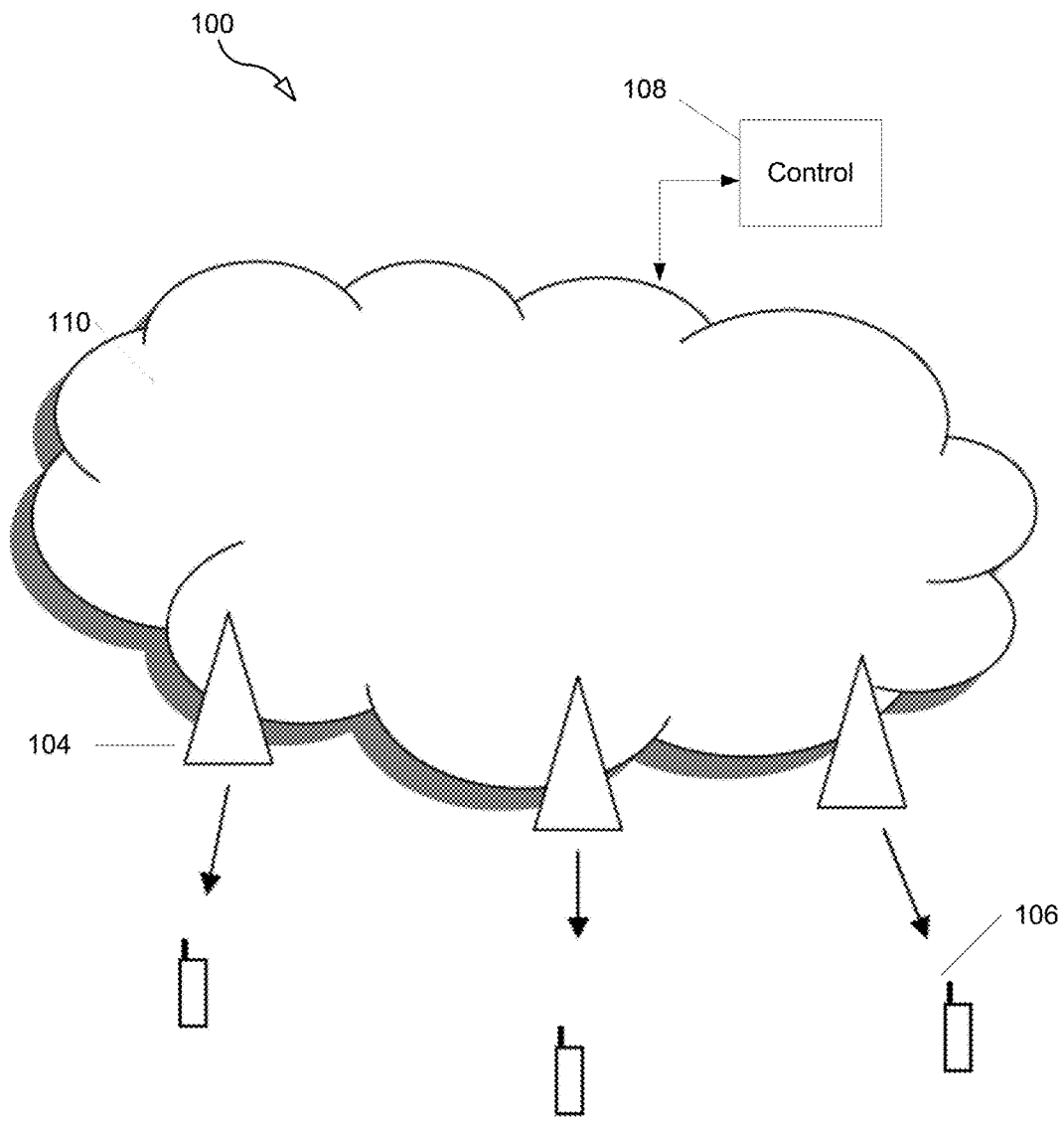
FIG. 1 is an illustration of a wireless communication system in accordance with exemplary embodiments.

Referring to FIG. 1, a wireless communication deployment 100 in accordance with exemplary embodiments includes a base station 104 (a.k.a., access node) serving a wireless communication device (WCD) 106. Examples of WCDs include, but are not limited to, mobile telephones, UEs, personal digital assistants, electronic readers, portable electronic tablets, wireless sensors, machine communication devices, personal computers, and laptop computers. Furthermore, the device 106 may be a legacy WCD or dynamic TDD capable WCD. Base station 104 may be, for example, a NodeB, a combination of a Radio Network Controller and a NodeB connected to the RNC, an evolved NodeB (eNodeB or eNB), a relay node, or a gateway type device, and is capable of communicating with device 106, along with any additional elements suitable to support wireless communication between wireless communication devices or between a wireless communication device and another communication device, such as landline telephone. The base station 104 may be in communication with, for instance via a network 110, one or more control nodes 108, such as a Serving GPRS Support Node (SGSN), Mobility Management Entity (MME), a Mobile Switching Center (MSC), etc. Although node 108 is explicitly identified as a control node, each of base station 104 may be understood as a "control" node to the extent that it includes a control unit or otherwise implements control functions.

Figure 2:
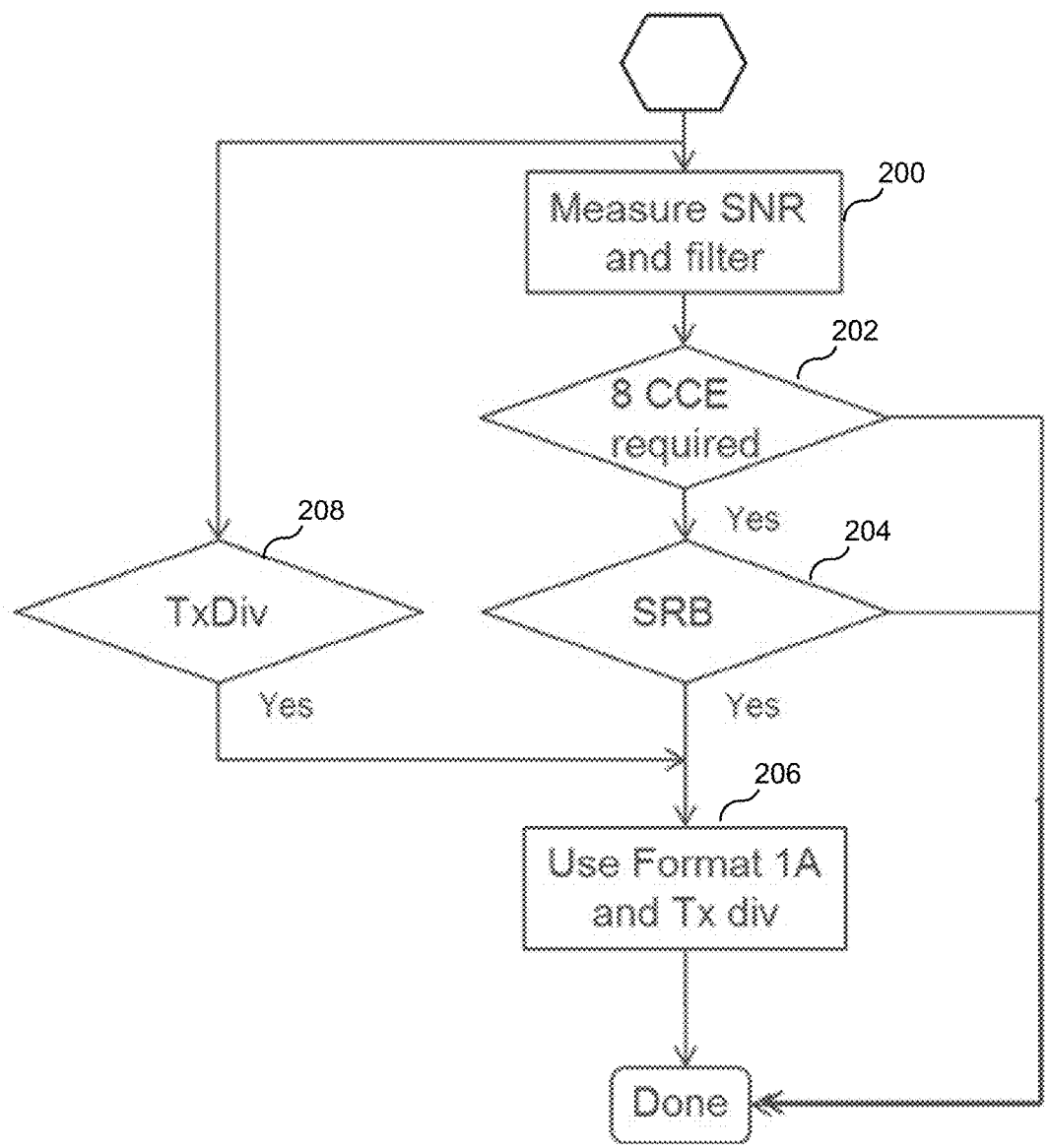
FIG. 2 is an illustration of a process in accordance with exemplary embodiments.

Embodiments use format 1A to increase SRB signaling robustness in the DL direction. FIG. 2 illustrates an embodiment of a process for determining when to use DCI Format 1A in the DL direction. The process starts at step 200 where the base station 104 obtains a signal to noise ratio (SNR) for a channel between the base station and the wireless communication device. The base station may measure the SNR itself, or receive a report from the wireless communication device that includes a SNR measured by the wireless communication device.

In step 202, the base station determines whether the 8 CCE power level (i.e., aggregation level) is required based on the determined SNR. For example, when the determined SNR is below a predetermined threshold, the base station may determine that the wireless communication device is in a high pathloss area (e.g., cell edge). In step 204 the base station determines whether SRB assignments are required. If the base station determines that SRB assignments are required and the maximum CCE aggregation level is required, the process proceeds to step 206 where the base station transmits a DL message using DCI Format 1A and Tx diversity. Furthermore, at step 208, if the base station determines that Tx diversity is required, the process proceeds to step 206 where the base station transmits a DL message using DCI Format 1A and Tx diversity.

Figure 3:
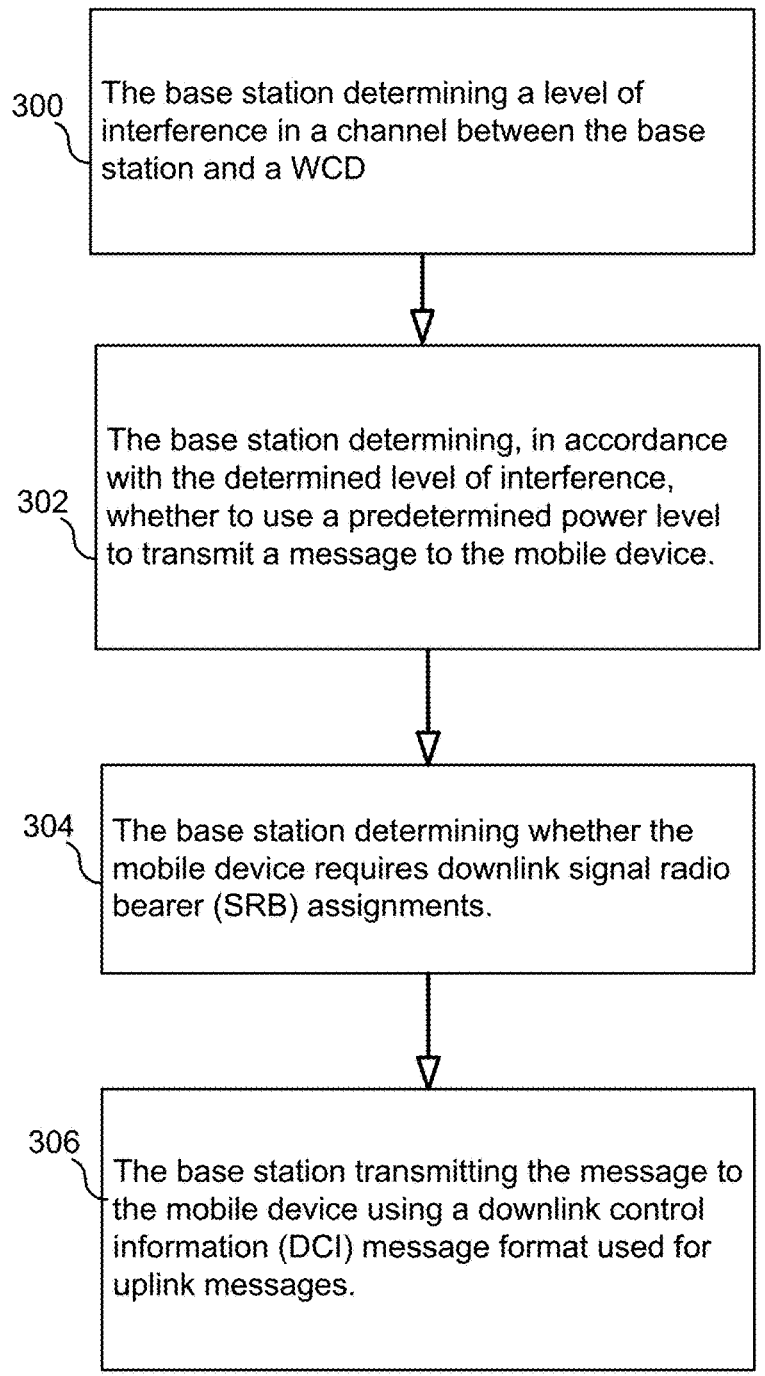
FIG. 3 is an illustration of a process in accordance with exemplary embodiments.

FIG. 3 illustrates another embodiment of a process performed by the base station. The process may start at step 300 where the base station determines a level of interference in a channel between the base station and the wireless communication device (this determination of the level of interference may be based on a signal-to-noise-ratio (SNR) in the channel). In step 302, the base station determines, in accordance with the determined level of interference, whether to use a predetermined power level (i.e., aggregation level) to transmit a message to the wireless communication device. In step 304, the base station determines whether the wireless communication device requires downlink signal radio bearer (SRB) assignments (step 304 may be performed in response to determining to use the predetermined power level). In step 306, the base station transmits the message to the wireless communication device using a downlink control information (DCI) message format (e.g., DCI format 1A) having a same size as a message format used for uplink messages. As shown in FIG. 3, step 306 is performed in response to: i) determining that the wireless communication device requires the downlink SRB assignments and ii) determining to use the predetermined aggregation level.

Figure 4:
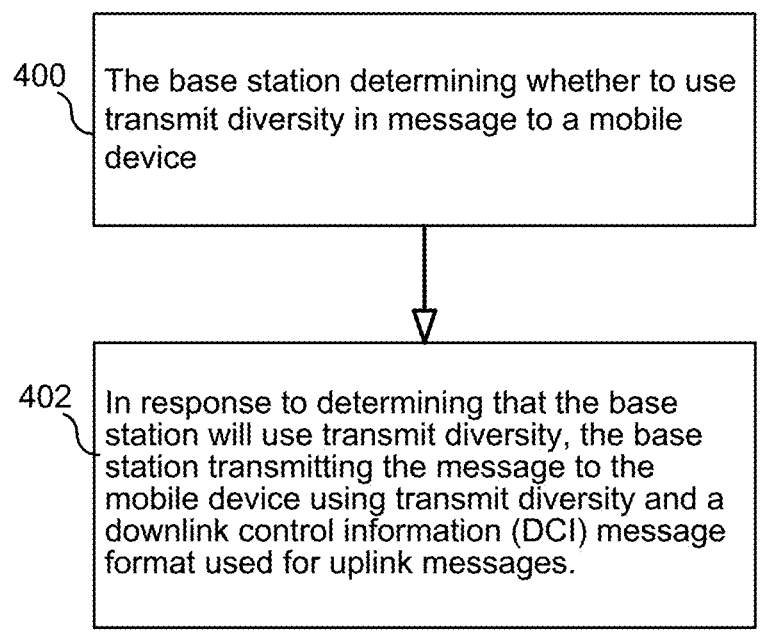
FIG. 4 is an illustration of a process in accordance with exemplary embodiments.

FIG. 4 illustrates another embodiment of a process performed by the base station. The process may start at step 400 where the base station determines whether to use transmit diversity in message to a wireless communication device. In step 402, in response to determining that the base station will use transmit diversity, the base station transmits the message to the wireless communication device using transmit diversity and a downlink control information (DCI) message format (e.g., DCI format 1A) used for uplink messages.

Figure 5:
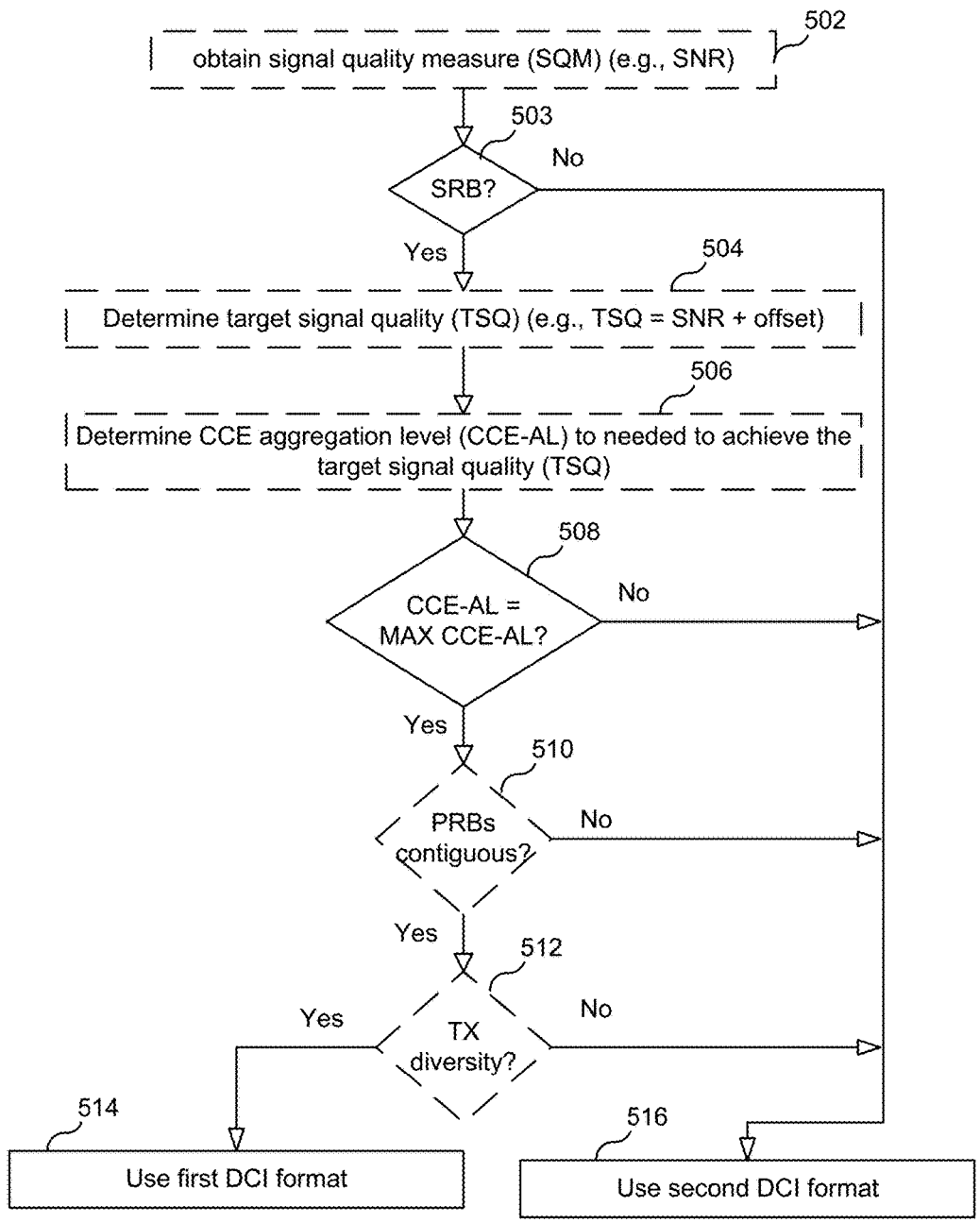
FIG. 5 is an illustration of a process in accordance with exemplary embodiments.

FIG. 5 is a flow chart illustrating another embodiment of a process performed by the base station. The process, in some embodiments, begins in step 502, in which the base station obtains a signal quality measure (SQM). For example, the base station may obtain the SQM by calculating or otherwise obtaining an signal to noise ratio (SNR) or a signal to interference plus noise ration (SINR). In step 503, the base station determines whether a WCD requires a downlink signal radio bearer (SRB) assignment. If not, the process proceeds to step 516, otherwise the process proceeds to step 504.

In step 504, the base station determines a target signal quality (TSQ). For example, the base station may determine the TSQ by calculating: SNR+offset. In some embodiments the offset is a fixed, predetermined value (e.g., 3 dB). In other embodiments, the offset is selected based on a parameter of the SRB.

In step 506, the base station determines the CCE aggregation level (CCE-AL) that is needed to achieve the target signal quality (TSQ).

In step 508, the base station determines whether the CCE-AL determined in step 506 is the maximum allowable CCE-AL. If the CCE-AL determined in step 506 is not the maximum allowable CCE-AL, the process proceeds to step 516, otherwise the process may proceeds to steps 510 and 512. In step 510, the base station determines whether assigned physical resource blocks (PRBs) are contiguous in frequency. In step 512, the base station determines to use transmit (Tx) diversity.

In step 514, the base uses a first DCI format to transmit a message to the WCD and in step 516, the base uses a second DCI format to transmit the message to the WCD. The first DCI format (e.g., DCI format 1A) is more robust than the second DCI format (e.g. DCI format 2). As the flow chart shown in FIG. 5 indicates, steps 502, 504, 506, 510, 512 and 516 are optional.

As the above described processes indicate, the base station determines whether a certain set of one or more conditions is satisfied, and, in response to determining that the set of conditions is satisfied, the base station selects, from among a plurality of DCI formats corresponding to different respective DCI message sizes, a first DCI format, wherein the first DCI format is a robust DCI format. As further illustrated, determining whether the set of conditions is satisfied may, in some embodiments, include the base station determining whether an SRB assignment is required and whether a determined CCE aggregation level is equal to a maximum CCE aggregation level.

Figure 6:
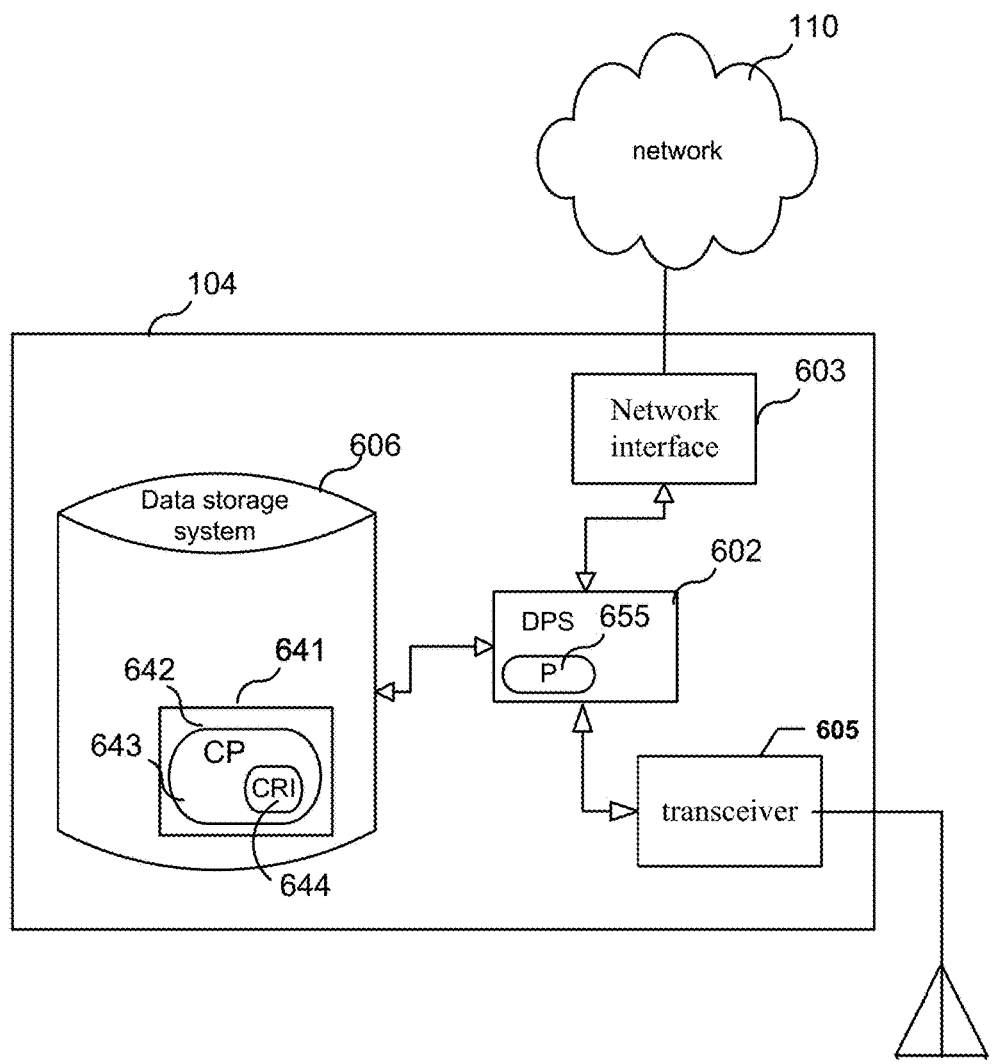
FIG. 6 is an illustration of a base station in accordance with exemplary embodiments.

FIG. 6 illustrates a block diagram of an exemplary base station, such as base station 104. As shown in FIG. 6, the base station 104 may include: a data processing system 602 comprising one or more processors 655, which processor 655 may include one or more microprocessors and/or one or more circuits, such as an application specific integrated circuit (ASIC), field-programmable gate arrays (FPGAs), and the like; a network interface 603 for connecting base station to a network (e.g., network 110) so that the base station can communicate with other devices on the network (e.g., control node 108); a transceiver 605 for use in wirelessly communicating with WCDs; and a data storage system 606, which may include one or more non-volatile storage devices and/or one or more volatile storage devices (e.g., volatile random access memory (RAM)).

In embodiments where processor 655 includes a microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited to, magnetic media (e.g., a hard disk), optical media (e.g., a DVD), memory devices (e.g., random access memory), and the like, but not a signal. In some embodiments, the CRI 644 of computer program 643 is configured such that when executed by processor 655, the CRI causes the processor 655 to perform steps described above. In other embodiments, processor 655 may be configured to perform steps described herein without the need for code. That is, for example, processor 655 may consist merely of one or more ASICs. Hence, the features of the embodiments described herein may be implemented in hardware and/or software.

Figure 7A:
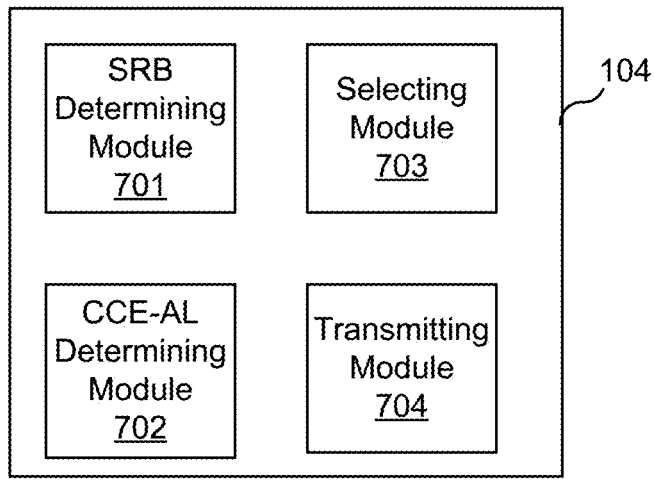
FIG. 7A schematically illustrates, in terms of a number of functional modules, components of a base station according to some embodiments.

FIG. 7A schematically illustrates, in terms of a number of functional modules, components of base station 104. As shown in FIG. 7A base station comprises a number of functional modules, including: a signal radio bearer, SRB, determining module 701 for determining whether a wireless communication device, WCD, requires a downlink SRB assignment; a control channel element, CCE, aggregation level determining module 702 for determining a CCE aggregation level for a transmission to the WCD based on whether the WCD requires the SRB assignment and for determining whether the determined CCE aggregation level is equal to a maximum CCE aggregation level; a selecting module 703 for, in response to determining that a set of conditions is satisfied, selecting, from among a plurality of DCI formats corresponding to different respective DCI message sizes, a first DCI format, wherein the first DCI format is a robust DCI format and the set of conditions comprises the determined CCE aggregation level being equal to the maximum CCE aggregation level; and a transmitting module 704 for employing a transceiver system to transmit the message to the WCD using the first DCI format. It should be understood that the modules 701-704 in one embodiment may be enabled through software instructions and in another embodiment through hardware, such as ASICs and DSPs, and in further embodiments through a mix of hardware and software.

Figure 7B:
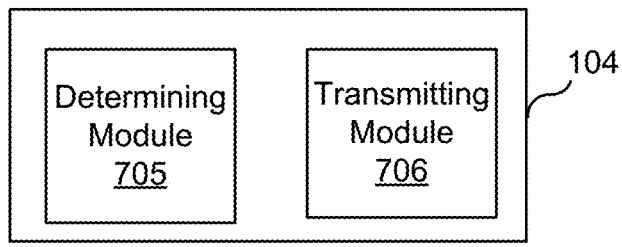
FIG. 7B schematically illustrates, in terms of a number of functional modules, components of a base station according to some embodiments.

FIG. 7B schematically illustrates, in terms of a number of functional modules, components of base station 104. As shown in FIG. 7B base station comprises a number of functional modules, including: a determining module 705 for determining whether to use transmit diversity to transmit a message to a wireless communication device; and a transmitting module 706 for, in response to determining to use transmit diversity to transmit the message, employing a transceiver system (505) to transmit the message to the wireless communication device using transmit diversity and a downlink control information, DCI, message format used for uplink messages. It should be understood that the modules 705 and 706 in one embodiment may be enabled through software instructions and in another embodiment through hardware, such as ASICs and DSPs, and in further embodiments through a mix of hardware and software.

Figure 7C:
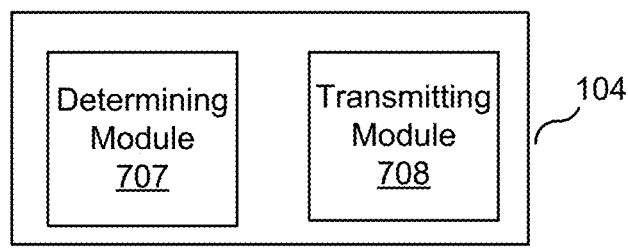
FIG. 7C schematically illustrates, in terms of a number of functional modules, components of a base station according to some embodiments.

FIG. 7C schematically illustrates, in terms of a number of functional modules, components of base station 104. As shown in FIG. 7C base station comprises a number of functional modules, including: a determining module 707 for determining whether a wireless communication device, WCD, requires a downlink signal radio bearer, SRB, assignment; and a transmitting module 708 for, as a result of determining that the WCD requires an SRB assignment, using for the transmission of the SRB assignment i) a maximum control channel element, CCE, aggregation level and ii) a robust downlink control information, DCI, message format. It should be understood that the modules 707 and 708 in one embodiment may be enabled through software instructions and in another embodiment through hardware, such as ASICs and DSPs, and in further embodiments through a mix of hardware and software.

The embodiments disclosed herein provide the significantly advantageous features of better handover and cell edge performance, which results in a lower interruption time and less drops.

It should be noted that in some implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method performed in a base station, the method comprising:
    determining whether a wireless communication device (WCD) requires a downlink signal radio bearer (SRB) assignment;

determining a control channel element (CCE) aggregation level for a transmission to the WCD based on whether the WCD requires the SRB assignment, wherein determining the CCE aggregation level comprises determining a target signal quality and determining the target signal quality comprises adding a predetermined offset to a determined signal quality measure;

determining whether a certain set of one or more conditions is satisfied, wherein determining whether the set of conditions is satisfied comprises the base station determining whether the determined CCE aggregation level is equal to a maximum CCE aggregation level;

in response to determining that the set of conditions is satisfied, selecting, from among a plurality of DCI formats corresponding to different respective DCI message sizes, a first DCI format, wherein the first DCI format is a robust DCI format; and transmitting a message to the WCD using the first DCI format.

2. The method of claim 1, wherein determining whether the set of conditions is satisfied further comprises:
determining whether assigned physical resource blocks (PRBs) are contiguous in frequency; and
determining to use transmit (Tx) diversity.

3. The method of claim 1, wherein the robust DCI message format is DCI Format 1A.

4. The method of claim 1, wherein:
determining the CCE aggregation level based on whether the WCD requires the SRB assignment comprises the base station calculating the CCE aggregation level based on i) a value indicating the quality of the channel between the base station and the WCD and ii) an offset value.

5. The method of claim 4, wherein the value indicating the quality of the channel is a signal-to-noise ratio (SNR).

6. The method of claim 5, wherein the base station measures the SNR of the channel between the base station and the wireless communication device.

7. The method of claim 5, wherein the base station receives one or more measurement reports from the wireless communication device, the measurement reports comprising information to enable the base station to determine the SNR.

8. The method of claim 5, wherein determining the CCE aggregation level based on whether the WCD requires the SRB assignment comprises the base station calculating the CCE aggregation level based on i) the SNR and ii) an offset value for increasing the SNR.

9. The method of claim 1, wherein the message is an SRB message.

10. The method of claim 1, wherein
the determined CCE-AL is a CCE-AL that is needed to achieve the target signal quality.

11. The method of claim 1, wherein determining the target signal quality comprises:
selecting the predetermined offset based on a parameter of the SRB; and
adding the selected predetermined offset to a determined signal quality measure.

12. A base station, the base station comprising:
a transceiver system for communicating with a wireless communication device, WCD; and
a data processing system comprising one or more processors, the data processing system being in communication with the transceiver system and being configured to:
determine whether a wireless communication device (WCD) requires a downlink signal radio bearer (SRB) assignment;
determine a control channel element (CCE) aggregation level for a transmission to the WCD based on whether the WCD requires the SRB assignment, wherein determining the CCE aggregation level comprises determining a target signal quality and determining the target signal quality comprises adding a predetermined offset to a determined signal quality measure;
determine whether a certain set of one or more conditions is satisfied by performing a process comprising determining whether the determined CCE aggregation level is equal to a maximum CCE aggregation level;
in response to determining that the set of conditions is satisfied, select, from among a plurality of DCI formats corresponding to different respective DCI message sizes, a first DCI format, wherein the first DCI format is a robust DCI format; and
employ the transceiver system to transmit the message to the WCD using the first DCI format.

* * * * *